US012684281B2

(12) United States Patent
Pedersen et al.

(10) Patent No.: US 12,684,281 B2
(45) Date of Patent: Jul. 14, 2026

(54) GAMING HEADSET WITH ACTIVE NOISE CANCELLATION

(71) Applicant: ACEZONE APS, Frederiksberg (DK)

(72) Inventors: Søren Louis Pedersen, Aarhus (DK); Christian Poulsen, København (DK)

(73) Assignee: Acezone APS, Frederiksberg (DK)

( * ) Notice: Subject to any disclaimer, the term of this patent is extended or adjusted under 35 U.S.C. 154(b) by 404 days.

(21) Appl. No.: 18/555,369

(22) PCT Filed: Mar. 21, 2022

(86) PCT No.: PCT/EP2022/057281
§ 371 (c)(1),
(2) Date: Oct. 13, 2023

(87) PCT Pub. No.: WO2022/218643
PCT Pub. Date: Oct. 20, 2022

(65) Prior Publication Data
US 2024/0205587 A1 Jun. 20, 2024

(30) Foreign Application Priority Data

Apr. 15, 2021 (DK) ............................ PA 2021 70176

(51) Int. Cl.
*H04R 1/10* (2026.01)
*A63F 13/25* (2014.01)
(52) U.S. Cl.
CPC ........... *H04R 1/1083* (2013.01); *A63F 13/25* (2014.09); *A63F 2300/572* (2013.01)
(58) Field of Classification Search
CPC ............ H04R 1/1083; H04R 2201/107; H04R 2227/009; H04R 27/00; A63F 13/25; A63F 2300/572; A61F 11/145
See application file for complete search history.

(56) References Cited

U.S. PATENT DOCUMENTS

| | | | |
|---|---|---|---|
| 9,197,974 B1 | 11/2015 | Clark et al. | |
| 9,966,059 B1 | 5/2018 | Ayrapetian et al. | |

(Continued)

FOREIGN PATENT DOCUMENTS

| | | | |
|---|---|---|---|
| EP | 3136750 A1 | 3/2017 | |
| EP | 3800900 A1 | 4/2021 | |
| WO | WO 2016/105455 A1 | 6/2016 | |

OTHER PUBLICATIONS

International Patent Application No. PCT/EP2022/057281; Int'l Search Report and the Written Opinion; dated Sep. 15, 2022; 27 pages.

(Continued)

*Primary Examiner* — Peter J Iannuzzi
(74) *Attorney, Agent, or Firm* — BakerHostetler

(57) ABSTRACT

A gaming headset system for use in a game event. A headset (HS) has a mouth microphone (MM), and a headphone with over-the-car car-cups (EC) each having inside a loudspeaker transducer (LT) and a feed-back microphone (FB). A feed-forward microphone (FF) is placed on an exterior part of the car-cups (EC). An ambient noise and speech suppression system (ANSS) serves to attenuate ambient noise and suppress intelligibility of ambient speech sound reaching the gamer (GM) in response to input signals indicative of sound captured by one or more of: 1) the mouth microphone (MM). 2) the feed-forward microphones (FF), 3) the feed-back microphones (FB), and 4) one or more sources (GSP_I. AUDM) located external to the car-cups (EC). The ambient noise and speech suppression algorithm comprises an active noise cancellation algorithm part (ANC) and a masking noise signal algorithm part (MSK) which in combination provides an effective active attenuation of noise and speech reaching the gamer and ensuring that even weak speech sounds will not be understood by the gamer. E.g. the ANSS algorithm may use microphones near the game speaker or (Continued)

game commentator and/or the audience for the ANC algorithm part and/or the masking noise signal algorithm part.

23 Claims, 2 Drawing Sheets

(56) References Cited

U.S. PATENT DOCUMENTS

| | | | |
|---|---|---|---|
| 9,984,673 | B2 | 5/2018 | Jung |
| 10,111,014 | B2 | 10/2018 | Schnell et al. |
| 10,212,520 | B2 | 2/2019 | Zepp et al. |
| 10,249,323 | B2 | 4/2019 | Saffran |
| 10,311,889 | B2 | 6/2019 | Ganeshkumar et al. |
| 10,341,759 | B2 | 7/2019 | Dusan et al. |
| 10,347,236 | B1 | 7/2019 | Bastyr et al. |
| 10,354,639 | B2 | 7/2019 | Scanlan |
| 10,361,673 | B1 | 7/2019 | Matsukawa |
| 10,396,741 | B2 | 8/2019 | Kuruba et al. |
| 10,971,130 | B1 | 4/2021 | Amengual et al. |
| 2002/0141599 | A1 | 10/2002 | Trajkovic et al. |
| 2016/0125869 | A1 | 5/2016 | Kulavik et al. |
| 2016/0300563 | A1 | 10/2016 | Park et al. |
| 2017/0041710 | A1 | 2/2017 | Zepp et al. |
| 2017/0318374 | A1 | 11/2017 | Dolenc et al. |
| 2019/0028803 | A1* | 1/2019 | Benattar ................ H04S 7/304 |
| 2019/0043518 | A1 | 2/2019 | Li et al. |
| 2019/0130930 | A1 | 5/2019 | Tong et al. |
| 2019/0251955 | A1 | 8/2019 | DeGraye et al. |

OTHER PUBLICATIONS

ArkarTech Casque Gaming Micro G2000 Casque Filaire PC Headset Basse Stéréo LED Lumière Contrôle Volume Pour PC, Bleu Noir: Amazon.fr: Hightech; Sep. 10, 2019; one page.
B&O: Active Noise Cancellation; Feb. 2018; one page.
Shen et al.; "Mute: Bringing IoT to Noise Cancellation"; SIGCOMM; Aug. 2018; 15 pages.
Rudzyn et al., Performance of Personal Active Noise Reduction Devices, Applied Acoustics, 2012, pp. 1159-1167, vol. 73, Elsevier Ltd., http://dx.doi.org/10.1016/j.apacoust.2012.05.013.

* cited by examiner

GAMING HEADSET WITH ACTIVE NOISE CANCELLATION

CROSS-REFERENCE TO RELATED APPLICATIONS

This application is the National Stage of International Patent Application No. PCT/EP2022/057281 (filed Mar. 21, 2022); which claims priority to and the benefit of Danish Application No. PA 2021 70176 (filed Apr. 15, 2021). All foregoing applications are incorporated herein by reference in their entireties for any and all purposes.

FIELD OF THE INVENTION

The present invention relates to the field of audio signal processing, especially digital audio signal processing with active noise cancellation (ANC), also called active noise reduction (ANR), and more specifically to a gaming headset system suitable for gaming and e-sport events, e.g. tournaments or other competitions with gamers present in a high background noise level.

BACKGROUND OF THE INVENTION

For gaming or e-sport events or tournaments, it is crucial with headsets having optimal suppression of noise from the surroundings, especially speech or shouts from the audience or speech from a speaker commenting the game (game commentator). Ideally, the gamers should only hear the game sound and inter-communication with their team members. Otherwise, gamers may hear words from the surroundings which can be helpful for the gamers to perform tasks in the game. Thus, such help can be treated as cheating in the game.

Passive acoustic attenuation in headsets in itself is not enough to effectively suppress loud speech so that it is inaudible or at least nearly inaudible. By using an active noise cancellation (ANC) system, effective suppression of stationary sounds can be obtained, however non-stationary sounds such as speech is not effectively cancelled.

Basically, the major problem is that the mouth microphone of the headset captures the voice of the gamer, while the mouth microphone will also capture voice from audience or game commentator. Thus, both the intended sound and the background noise are voices, and thus the background noise suppression problem is complex and difficult to solve.

SUMMARY OF THE INVENTION

Thus, according to the above description, it is an object of the present invention to provide a gaming headset with an efficient suppression of the noise and speech which is normally present in an e-sport or gaming tournament event, to ensure that the gamer wearing the headset will be isolated from such noise and speech.

In a first aspect, the invention provides a gaming headset system for use in a game event, the gamer headset system comprising a headset comprising a headphone and a mouth microphone to be worn by a gamer, wherein the headphone comprises two over-the-ear ear-cups each having inside a loudspeaker transducer and a feed-back microphone, wherein a feed-forward microphone is placed on an exterior part of each of the ear-cups, and an ambient noise and speech suppression system arranged to attenuate ambient noise and suppress intelligibility of ambient speech sound reaching the gamer, wherein the ambient noise and speech suppression system comprises a processor system arranged to execute an ambient noise and speech suppression algorithm comprising an active noise cancellation algorithm part arranged to operate in a combined feed-back and feed-forward configuration in response to input signals indicative of sound captured by one or more of: 1) the mouth microphone, 2) the feed-forward microphones, 3) the feed-back microphones, and 4) one or more sources located external to the ear-cups, so as to provide output signals to the respective loudspeaker transducers in the ear-cups of the headphone, and a masking noise signal algorithm part arranged to add a masking noise signal to the output signals to the respective loudspeaker transducers in the ear-cups of the headphone so as to provide a psychoacoustic masking effect of speech sound from the game speaker (game commentator) and/or speech sound from the audience reaching the gamer's ear drums, wherein the masking noise signal generator part generates the masking noise signal in response to at least one input signal indicative of sound captured by one or more of: 1) the mouth microphone, 2) the feed-forward microphones, 3) the feed-back microphones, and 4) one or more sources located external to the ear-cups.

Such gaming headset system with an ambient noise and speech suppression (ANSS) system is advantageous, since it allows a high degree of suppression of speech sounds present during e-sport events where gamers are supposed not to hear nor to understand any speech from the surroundings in spite of loud speech or shouts from an audience and a game speaker (game commentator) commenting the game via PA loudspeakers. The improvement over prior art ANC headsets is that the inventors have realized that the combination of an ANC algorithm part to attenuate unintended environmental speech sound and psychoacoustic masking signal algorithm part can ensure that the gamer will not disturbed either by noise or any environmental speech sound that may include information or messages.

In spite of effective active and passive attenuation, it has been found that that the attenuated speech reaching the gamer's ears can still be audible, and this is solved by the masking noise signal which will ensure that the gamer can at least not understand any remaining speech. Especially, the masking noise can be generated in an effective manner, i.e. not too loud but still effective in suppression speech intelligibility, since it can be generated in response to the actual speech reaching the gamer by use of e.g. the feed-forward microphones on the headset and/or external microphones close to the source, i.e. the game speaker (game commentator) and/or the audience.

All in all, the gaming headset system allows the gamer to focus on the game and not guiding focus on any noise or trying to understand speech from the audience or game speaker (game commentator). Further, this provides a minimal chance of the gamer cheating by gaining information from the audience or the game speaker (game commentator).

In some embodiments, the ANC algorithm part may benefit from information about the incoming sound in advance of the sound actually arriving at the feed-forward and/or feed-back microphones of the gamer's headset. This allows for more processing time for the ANC algorithm resulting in an improved suppression of the incoming sound, especially important with respect to non-stationary sound with a frequency content above such as 500-1,000 Hz, such as speech. Hereby, combined with the passive acoustic insertion loss provided by the ear-cups (preferably at least 10 dB at speech frequencies), in addition to stationary sound suppression provided also by the ANC algorithm, a significant suppression of game specific speech can be obtained, thus reducing any possible cheating effects in the game.

It has been found that an improved suppression can be obtained, in case more separate feed-forward microphones and/or more separate mouth microphones are used. Such extra inputs to the ANC algorithm part help to suppress game speaker (game commentator) and audience speech sounds in spite of an (unknown) complex acoustic environment which may further be dynamic due to head movements of the gamer and/or movements of the audience etc. Especially, such extra inputs from directive beamforming mouth and/or feed-forward microphones allow the ANC algorithm part to more effectively take into account disturbing sound from different directions.

A psychoacoustic masking signal is applied to the loudspeakers of the headset to mask any possible ambient speech signal which reaches the gamer's ear drums in spite of the ANC suppression and a passive insertion loss, especially this is suitable in case of any possible leakage at one or both ear-cups. In this way, the gamer will be prevented from understand any information or message in the remaining speech. Specifically, such masking signal may comprise a scrambled version of ambient speech captured by the mouth microphone, the feed-back microphone(s), the feed-forward microphone(s), and one or more microphones dedicated to capture speech near the gaming speaker and/or the gaming audience. In this way, the residual ambient speech reaching the gamer's ear drums will be at least partly masked by the added masking signal from the headset loudspeakers, thereby reducing the risk that the gamer can understand words in the residual speech.

The ANSS algorithm may be even further improved to suppress game specific speech by receiving input of game specific keywords. By such knowledge, the ANC algorithm part can be trained to recognize such keywords in the sound inputs from audience and game speaker (game commentator), thereby allowing an even more effective suppression of these keywords.

In the following preferred features and embodiments of the first aspect will be described.

In preferred embodiments, the ANC algorithm part is further arranged to receive an input signal indicative of sound captured by the mouth microphone, and wherein the ANC algorithm part is arranged to further operate on said input signal indicative of sound captured by the mouth microphone. This allows suppression of speech from the audience and game speaker (game commentator) which will be captured by the mouth microphone, when activated by the gamer, and thus allowing suppression of such speech sounds in the mouth microphone signal before it is transmitted to associated gamer's headsets. Preferably, the ANC system is also arranged to provide the output signals to the respective loudspeaker transducers for reproduction of the game sound to the gamer with an optimized suppression of speech sound from the game speaker (game commentator) and speech sound from the audience captured by the mouth microphone.

In some embodiments, the headset comprises a plurality of separate mouth microphones, such as a plurality of microphones to be used for beamforming with beams in different directions, and wherein the ANC system is arranged to receive input signals indicative of sound captured by the separate mouth microphones, so as to allow the ANC algorithm part to more effectively suppress speech sound from the game speaker (game commentator) or from the audience captured from the mouth microphones. This has been found to provide a better suppression of disturbing sound from different directions. Preferably, 2-6 directive microphones are used with their directive beams pointing in different directions.

In some embodiments, the headset comprises a plurality of separate feed-forward microphones placed at different positions on an exterior part of each of the ear-cups, and wherein the ANC algorithm part is arranged to receive input signals indicative of sound captured by the separate feed-forward microphones, so at to allow the ANC algorithm part to more effectively suppress speech sound from the game speaker (game commentator) or from the audience arriving to the headset from directions. This has been found to provide a better suppression of disturbing sound from different directions. Preferably, 2-6 directive or non-directive microphones are distributed on each ear-cup.

It may be preferred, that the two above-mentioned embodiments are combined, i.e. the headset comprising a plurality of mouth microphones and a plurality of feed-forward microphones, and wherein the ANC algorithm part operates on all inputs from these mouth microphones and feed-forward microphones. In this way, it has been found to be possible to obtain the most efficient suppression of game speaker (game commentator) and audience speech sounds. Using both multiple mouth microphones and multiple feed-forward microphones, it has been found that any input from an external source (either game speaker (game commentator) sound or audience sound or both) may be avoided even for a high degree of suppression.

The ANC algorithm part may further be arranged to receive an input indicative of information related to the game event, and wherein said information is used by the ANC algorithm part, so as to improve suppression of game related speech sound from the game speaker (game commentator) and game related speech sound from the audience. This game event related information may be in the form of one or more keywords and/or sounds related to the game, such as names, places, numbers or the like, and with this information, the ANC algorithm part can be trained to recognize in the sound picked up from the audience and the game speaker (game commentator), and thus allowing an even more efficient active noise suppression of such words. Especially, the information may be in the form of pre-stored audio data indicative of speech sound or keywords related to the game. Especially, the information may comprise one or more pieces of information regarding an acoustic environment at the game event site, e.g. information regarding size and/or dimensions of the room or hall where the game event takes place, a measure of reverberation time in the room or hall etc.

In some embodiments, the ANC algorithm part involves an adaptive filter.

In preferred embodiments, the ANC algorithm part is implemented as a digital solution, however, in principle an analog ANC algorithm part implementation can be used as well, or a combined analog and digital implementation.

In preferred embodiments, the two ear-cups are designed to provide a passive acoustic insertion loss of at least 10 dB within 300-3,400 Hz, e.g. at least 20 dB within 300-3,400 Hz. By passive acoustic insertion loss of at least X dB within 300-3,400 Hz is understood a passive acoustic insertion loss which is not below X dB in any $\frac{1}{3}$ octave frequency band within 300-3,400 Hz.

The over-the-ear ear-cups preferably comprise ear pads serving to allow the ear-cups to provide an airtight enclosure around the gamer's ears. This helps to provide a sufficiently high passive acoustic insertion loss, but may be uncomfortable and allow heat to build up. Thus, in some embodiments, a cooling element is built into the ear pads, so as to allow cooling. E.g. this cooling element comprises a peltier element or similar thermoelectric element. In some embodiments, an actuable ventilation mechanism is arranged to allow air to enter the ear-cups for cooling when the ventilation mechanism is in an open state, and to provide an airtight enclosure around the gamer's ear in a closed state. To avoid the gamer cheating by opening the ventilation mechanism to hear sound from the surroundings, a sensor may be installed to detect when the ventilation mechanism is opened, and to generate a warning about this, e.g. a gaming referee.

The game sound may comprise sound generated by a game computer and sound captured by mouth microphones of associated gamers.

Preferred embodiments comprise one or more microphones arranged for position near or within the audience to provide said input signal indicative of speech sound from an audience. Hereby, the speech sound from the audience can be effectively captured at a distance from the gamer, thus the ANC algorithm part has the benefit of the time from capturing the audience speech sound to the airborne sound arrives at the gamer, thereby allowing an efficient suppression of the audience speech sound. More microphones may be placed as a combination of within the audience and at a short distance to the audience in the direction of where the gamer is positioned. The microphones may be directional or non-directional, and they may be wired or wirelessly connected to the ANSS system.

The ANSS system may be arranged for connection to a Public Address (PA) system reproducing the speech from the game speaker (game commentator) to provide said input signal indicative of speech from the game speaker (game commentator). As explained for the pickup of sound from the audience, such direct connection to the sound captured by a game speaker (game commentator) microphone allows the ANC algorithm part to utilize time to synchronize and provide an efficient correlation with the game speaker (game commentator) speech before it is transmitted via the PA loudspeakers and subsequently transmitted to the gamer by airborne sound transmission. This may allow for efficient suppression of speech from the game speaker (game commentator).

In some embodiments, the ANSS system operates on separate input signals indicative of speech sound from the game speaker (game commentator) and speech sound from the audience. Especially, one or both of such input signals may be utilized by the masking noise signal algorithm part to generate the masking noise signal. However, if preferred, the ANC algorithm part may be arranged to utilize one or both of such input signals indicative of speech sound from the game speaker (game commentator) and speech sound from the audience.

In some embodiments, the gaming headset system comprises two ear plugs to be positioned in respective ears of the gamer simultaneous with wearing the headset, so as to provide a passive attenuation of sound reaching the gamer's ear drums. Combining suppression of ambient sound by passive insertion loss of the ear-cups with ANC and with use of ear plugs, it can be ensured that the gamer will not be able to hear any ambient speech even in case of the gamer trying to cheat by introducing a leak in the ear-cups. E.g. the ear plugs can be any known ear plug for use inside the ear canal, e.g. a compressible type of ear plug.

The masking noise signal algorithm part may be arranged to generate the masking noise signal in response to at least an input signal indicative of one of or both of: speech sound from the game speaker (game commentator), and speech sound from the audience, e.g. outputs from microphone(s) placed near the game speaker (game commentator) and/or the audience. This helps to ensure that a proper masking signal can be generated to mask speech from the game speaker (game commentator) and/or the audience matching spectral and temporal properties of such speech, and thus an effective way of ensuring that the gamer will not be able to understand any information or messages in such speech can be provided.

Preferably, the masking noise signal algorithm part is arranged to generate the masking noise signal in response to at least an input signal indicative of sound captured by at least one of the feed-forward microphones (FF). Such microphone signal is available and thus provides an easy implementation without any additional inputs from any source external to the headset.

The masking noise signal algorithm part is preferably arranged to process said one or more input signals according to a scrambling algorithm to generate a scrambled version of said one or more input signals as at least a portion of the masking noise signal. By scrambling the input signal(s), it has been found that a good masking effect is obtained that effectively destroys speech intelligibility.

The masking noise signal algorithm part may be arranged to determine a level of the masking noise signal in response to a detected signal level of sound captured by the at least one feed-forward microphone. In this way, the masking noise signal can be aligned with the actual ambient noise level around the gamer, thus the masking noise signal level does not need to be too high or too low compared to the ambient noise level.

In some embodiments, the masking noise signal algorithm part may comprise an analysis part arranged to perform a spectral analysis on said one or more input signals, and to generate the masking noise signal accordingly. Especially, the algorithm may be based on known psychoacoustic principles for providing an effective masking.

In some embodiments, the ANSS system is arranged to determine a measure of effective acoustic insertion loss based on measurements involving sound captured by one or both of the feed-forward and one or both of the feed-back microphones. E.g. within a suitable time interval, sound energy captured within a predetermined limited frequency range by the feed-forward microphone can be subtracted by sound corresponding sound energy captured by the feed-back microphone as a measure of effective acoustic insertion loss. Especially, the ANSS system may be arranged to compare said measure of effective acoustic insertion loss with a predetermined criterion and to generate an output signal indicative thereof. This measure can especially be determined continuously or at regular time intervals and be used during a game event as a measure of revealing any attempts by a gamer to cheat by providing a leak to the surroundings to hear possible helpful messages from the audience. If the effective acoustic insertion loss is compared e.g. to a predetermined fixed minimum value, it can be considered as a leak, and thus possible cheating, if the effective acoustic insertion loss is determined to be below the fixed minimum value, and the headset system may then generate a warning or an alarm, e.g. to a referee of the game, allowing the referee to take action accordingly—e.g. stop the game, or inform the gamer to correct the headset etc. Specifically, the headset system may comprise a first light indicator placed on a visible exterior part of the headset to indicate in case said measure of effective acoustic insertion loss meets the predetermined criterion. This may help a referee to detect possible cheating by a gamer creating sound leaks to hear sound from the audience etc. Still further, a second light indicator may be placed on a visible exterior part of the headset to indicate in case the game sound is reproduced by the loudspeaker transducers. More specifically, a third light indicator may be placed on a visible exterior part of the headset to indicate in case the mouth microphone is functioning to allow the gamer to communicate with associated gamers. More specifically, a fourth light indicator may be placed on a visible exterior part of the headset to indicate that all of the criteria: 1) said measure of effective acoustic insertion loss meets the predetermined criterion, 2) the game sound is reproduced by the loudspeaker transducers, and 3) the mouth microphone is functioning, are fulfilled. E.g. this fourth light indicator can be ring shaped with all of the first, second and third light indicators arranged on a line inside said ring shaped fourth light indicator. This will help a game referee to visibly easily check if sound status on a gamer's headset is OK, and if not it is also easy to see which parameter(s) is not OK, especially if the first, second and third light indicators have different colours. Especially, all of the first, second, third and fourth light indicators may be positioned on an exterior surface of the mouth microphone to be easily visible when placed in front of the gamer, however additional light indicators or positions may be preferred.

It is to be understood, that the function of these light signals may be reversed if preferred, i.e. with the light off, if the criteria are met.

The ANSS system including a processor and associated memory can be implemented in different ways. Especially, the ANSS system can be arranged separate from the headphone, e.g. in a dedicated housing, or it may be integrated with the structure of the headphone, such as built-into one or both of the ear-cups.

In a second aspect, the invention provides an e-sport system comprising a plurality of gaming headset systems according to the first aspect. Such system is advantageous for team e-sport gaming events and tournaments.

Especially, the e-sport system may comprise a console for connecting the plurality of gaming headset systems, so as to allow respective gamers wearing the plurality of headsets to communicate via the mouth microphones. Especially, the plurality of ANSS systems of the gaming headset systems are arranged to determine respective measures of effective acoustic insertion loss based on measurements involving sound captured by the feed-forward and the feed-back microphones, and wherein said console comprises a processor system arranged to receive input signals indicative of said respective measure of effective acoustic insertion loss from the plurality of ANSS systems. This allows the console to communicate, e.g. via light indicators and/or a display and/or audible alarm(s), to a game referee the status of the gamers' headset acoustic insertion losses. E.g. the console may be arranged to generate an output signal in case one or more of said effective acoustic insertion losses is below a predetermined criterion, and especially the console may be arranged to generate a visual and/or audible alarm in case one or more of said effective acoustic insertion losses is below a predetermined criterion. Even more specifically, the console may be arranged to output information regarding which one or more of the plurality of gaming headset systems where the effective acoustic insertion loss is below the predetermined criterion. With such information, a game referee can take appropriate action in the control of the game.

In some embodiments, the console is arranged to output sound captured by a feed-back microphone of a selected one or more of the plurality of gaming headset systems. This may be used by the game referee to check and listen, or a TV transmission or internet streaming to transmit sound as it is heard by one or more of the gamers in an e-sport event, i.e. the same way as images and sound transmitted from the interior of a racing car to provide the feeling of the spectator to sit in the racing car during a race etc.

In some embodiments, the console is arranged to record sound captured by a feed-back microphone of all of the plurality of headset systems, so as to allow playback of sound previously captured by a feed-back microphone of a selected one of the plurality of gaming headset systems. This will allow the game referee to playback sound as heard by a gamer at a certain time, e.g. during a headset leak, and thus the referee can decide if the sound heard by the gamer during the leak included important speech from the game speaker (game commentator) or audience that may be considered as cheat.

In a third aspect, the invention provides a method for suppression of ambient noise and speech reaching the ears of a gamer wearing a headset for reproduction of the game sound to the gamer in a game event, the method comprising
    receiving an input indicative of sound captured by one or more of: 1) a mouth microphone of the headset, 2) a feed-forward microphone of the headset, 3) a feed-back microphone of the headset, and 4) one or more sources located external to the ear-cups of the headset,
    processing at least a part of said input according to an ANC algorithm part on a processor, such as the ANC algorithm part operating in a combined feed-back and feed-forward configuration to provide output signals to the respective loudspeaker transducers in the ear-cups of the headset for suppression of ambient noise and speech reaching the gamer, and
    processing at least a part of said input signal according to a masking noise signal algorithm part for generating a masking noise signal, and adding the masking noise signal to be reproduced by the loudspeaker transducers in the ear-cups of the headset for providing a psycho-acoustic masking effect on the gamer of speech sound from a game speaker (game commentator) and/or speech sound from an audience.

In a fourth aspect, the invention provides a computer program product having instructions which when executed cause a computing device or a computing system to perform the method according to the second aspect. The instructions of the computer program product may be present on a computer readable medium or in a downloadable form on the internet or downloadable by other means.

Especially, the computer program product may be one of: an audio application, a digital audio workstation plug-in, and a stand-alone software product for a general computer. It is to be understood that the computer program product instructions in the form of program code which may be implemented on any type of audio processing platform, e.g. a sound card in a computer, a general processor in a mobile device e.g. in the form of a downloadable application for a programmable device. Preferably, the computer program product implements a GUI.

In other versions, the computer program product is in the form of a processor dedicated code arranged for downloading or storing in a processor system forming part of a gaming headset. In still other versions, the computer program product is in the form of processor dedicated code for downloading in a dedicated device, such as a gaming specific device. Specifically, such program code may comprise instructions implementing a method comprising a plurality of separate ANC systems for respective gaming headsets.

The ANSS algorithm may be one integrated program code implementing all of the technical features defined according to the invention, or the program code may be separate into a specific ANC algorithm part and a specific masking signal noise algorithm part.

In a fifth aspect, the invention provides use of the gaming headset system according to the first aspect for an e-sport or gaming event, especially use for e-sport tournaments with competing teams of gamers.

In a sixth aspect, the invention provides use of the e-sport system according to the second aspect for an e-sport or gaming tournament, especially use for e-sport tournaments with competing teams of gamers.

In a seventh aspect, the invention provides use of the method according to the third aspect for an e-sport or gaming event.

It is appreciated that the same advantages and embodiments described for the first aspect apply as well for the second, third, fourth, fifth, sixth, and seventh aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
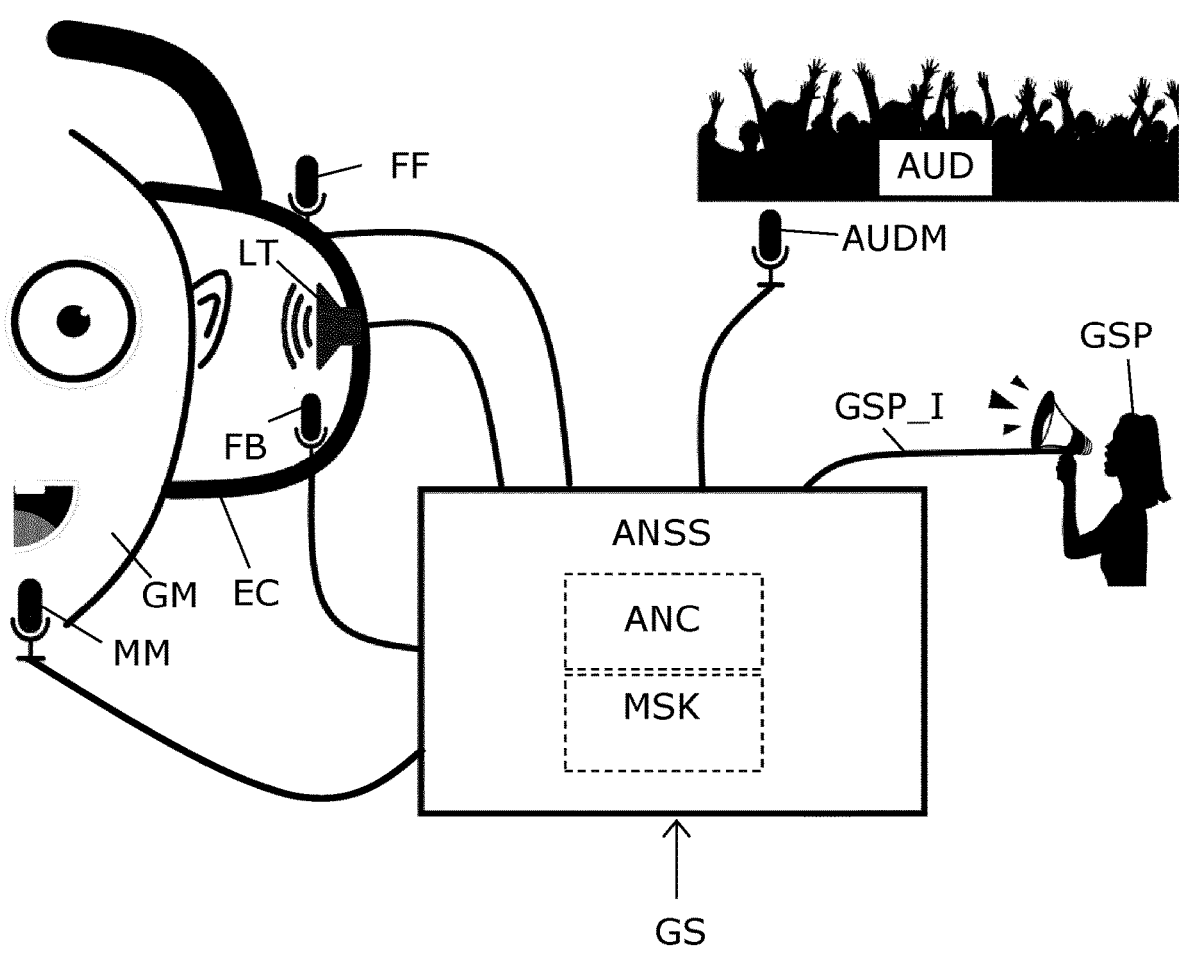
FIG. 1 illustrates a block diagram of a gaming headset system embodiment.

FIG. 1 shows a block diagram of a gaming headset system embodiment (only one side of the headset is shown for simplicity). A gamer GM wears a headset with a headphone and a mouth microphone MM, e.g. the mouth microphone MM has several separate microphones for beam forming. The headphone has two over-the-ear ear-cups EC. Inside each ear-cup EC a loudspeaker transducer LT and a feed-back microphone FB is located. One, or preferably several, feed-forward microphones FF are placed on an exterior part of each of the ear-cups EC. The ear-cups EC are preferably with airtight or at least substantially airtight ear pads so as to provide a passive acoustic insertion loss of at least 10 dB, preferably at least 15-20 dB within 300-3,400 Hz.

The function of the gaming headset is to allow the gamer GM to hear game sound GS, i.e. the sound of the computer generated as well as speech from the co-gamers' headsets mouth microphones. All ambient noise and speech should ideally be completely suppressed, so that the gamer GM is acoustically isolated from the surroundings.

An ambient noise and speech suppression system ANSS executes an ambient noise and speech suppression on a processor which comprises an ANC algorithm part ANC and a masking signal noise algorithm part MSK. This combination allows a high degree of ambient noise and speech suppression with a special focus on suppressing speech and speech intelligibility of speech from the surroundings that the gamer is not allowed to hear during a game, i.e. game speaker (game commentator) GSP and audience AUD.

In the shown embodiment, the ambient noise and speech suppression system ANSS receives an input signal indicative of speech sound GSP_I from a game speaker (game commentator) GSP commenting the game event, preferably by a direct connection to a PA system reproducing the game speaker's (game commentator's) voice via loudspeakers. The ANSS further receives an input signal indicative of speech sound from an audience AUD watching the game event, here shown as a single microphone AUDM placed near the audience AUD watching the game event. Further, the ANSS is connected to receive input from the feed-back microphones FB, input from the feed-forward microphones FF, and receive an input signal indicative of a game sound to be reproduced to the gamer GS, e.g. the game sound GS is a direct audio connection to the computer executing the game. The ANSS provides output signals to the respective loudspeaker transducers LT in the ear-cups of the headphone in response to the ANC algorithm part ANC as well as the masking signal noise algorithm part MSK.

The ANC algorithm part preferably operates in a combined feed-back and feed-forward configuration including at least inputs from the feed-forward microphone FF and the feed-back microphones FB, so as to provide the output signals to the respective loudspeaker transducers LT for reproduction of the game sound GS to the gamer with an optimized suppression of ambient noise and speech sound, especially speech sound from the game speaker (game commentator) and speech sound from the audience.

In some embodiments where the ANC algorithm part ANC utilizes one of or both of the inputs GSP_I, AUDM, the ANC algorithm part ANC may utilize the fact that increased processing time, hence algorithm complexity is possible, since the speech sound from the game speaker (game commentator) GSP and the audience AUD is applied to the ANC algorithm part in advance of being captured by the FF and FB microphones of the headset. Thus, even short shouts, e.g. words related to the game, can be effectively suppressed, since the expected sound arriving at the gamer's headset is known in advance, thereby allowing effective anti noise cancellation of such specific sounds.

The synchronization of the "noise", i.e. the sound input from the speaker GSP_I and sound AUDM from the audience, with sound captured by the feed-back or feed-forward microphones FF, FB is complex. However, in some embodiments, the ANC algorithm part ANC is arranged to adapt to provide this synchronization, and/or the ANC algorithm part ANC may include a speech algorithm part capable of recognizing parts of the speech from the speaker GSP or the audience AUD to facilitate this synchronization and thereby allow an improved cancellation of the speaker and audience speech sounds. This synchronization will further depend on the actual physical and electrical setup during a game event, and thus the ANC algorithm part is preferably arranged to adapt to such varying conditions to adapt to a specific event.

Alternatively or additionally, a calibration procedure may be performed to assist the adaptation of the ANC algorithm part.

Most preferably, several separate mouth microphones MM are used in combination with several feed-forward microphones FF distributed on each ear-cups EC, and wherein the ANC algorithm part ANC operates on all inputs from all mouth microphones and all feed-forward microphones FF to provide optimal suppression of speech sounds from the game speaker (game commentator) GSP and the audience AUD.

ANC algorithms in general involving feed-forward and feed-back are known in the art, but in the present context, a correlation algorithm with improved parameters can be implemented due to the significantly longer delay time which can be accepted due to the sound inputs being received ahead of the airborne sound arriving at the gamer's headset and thus also significantly ahead of the sound arriving at the feed-forward microphone FF and the feed-back microphones FB. It is to be understood that the ANC algorithm part ANC is preferably implemented as a stereo version to provide optimal use of the left set of FF and FB microphones to provide ANC to the left loudspeaker transducer LT and likewise for the right side, however a single channel ANC version may also be implemented if preferred.

The masking signal noise algorithm part MSK may generate a masking signal noise to be applied to the loudspeakers LT of the headset in response to an input comprising one or more of: 1) a signal from at least one of the feed-forward microphones FF, 2) a signal GSP_I indicative of speech sound from a game speaker (game commentator) GSP, a signal AUDM indicative of speech sound from the audience AUD.

A psychoacoustic masking signal is generated that will destroy speech intelligibility of any remaining speech sound that may reach the ears of the gamer GM in spite a passive insertion loss of the ear-cups EC and the attenuation or suppression provided by the ANC algorithm part ANC. This masking noise signal may be generated according to known principles in the art of psychoacoustics. Especially, the masking noise signal may be generated as a scrambled version of the input signal, e.g. based on the signal or one or more of the feed-forward microphones FF. This has been found as an effective and relatively simple way of providing a masking noise signal that destroys speech intelligibility.

Figure 2:
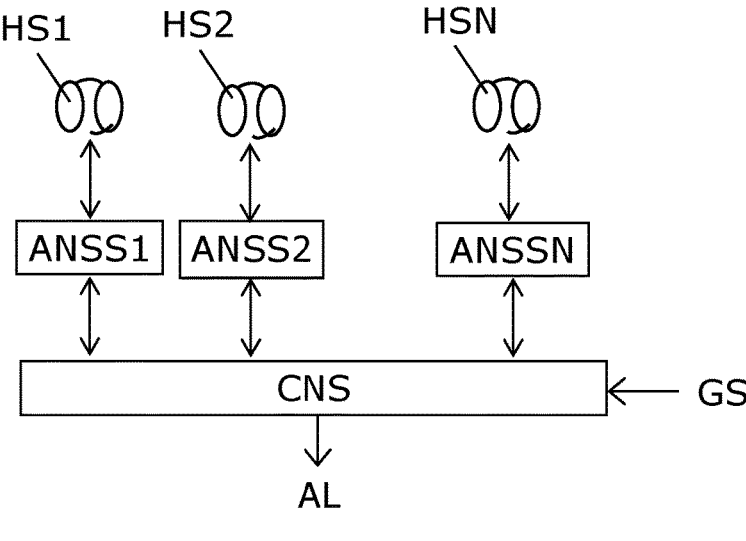
FIG. 2 illustrates a block diagram of an e-sport system embodiment.

FIG. 2 shows an e-sport system comprising a plurality of gaming headset systems with headsets HS1, HS2, HSN and individual ambient noise and speech suppression systems ANSS1, ANSS2, ANSSN as explained above, i.e. including ANC as well as masking noise signals. The gaming headset systems are connected to a console CNS so as to allow respective gamers wearing the plurality of headsets to communicate via the mouth microphones on their headsets HS1, HS2, HSN. The console CNS is connected to receive game sound GS from the computer executing the game, especially the console CNS is preferably connected to receive the different game sounds GS1, GS2, GS3, GSN from each computer executing the games for each gamer GM1, GM2, GM3, GMN. This allows a team of gamers to communicate while the system ANSS1, ANSS2, ANSSN serve to acoustically isolate the gamers from any sound from the surroundings, especially game related speech from the game speaker (game commentator) and the audience.

In the shown embodiment, the systems ANSS1, ANSS2, ANSSN are arranged to determine respective measures of effective acoustic insertion loss based on measurements involving sound captured by the feed-forward and the feed-back microphones of the headsets HS1, HS2, HSN. The console CNS has a processor system arranged to receive input signals indicative of said respective measure of effective acoustic insertion loss IL from the systems ANSS1, ANSS2, ANSSN. The console CNS can then compare the effective acoustic insertion losses to a predetermined threshold IL_TH and provide an output signal, e.g. an alarm AL to inform a game referee or the gamers that an acoustic leak is present in one or more of the gamer's headsets. Hereby cheating with intentionally introduced leaks in the headset ear-cups can be avoided, since the game referee can take appropriate action accordingly.

Figure 3:
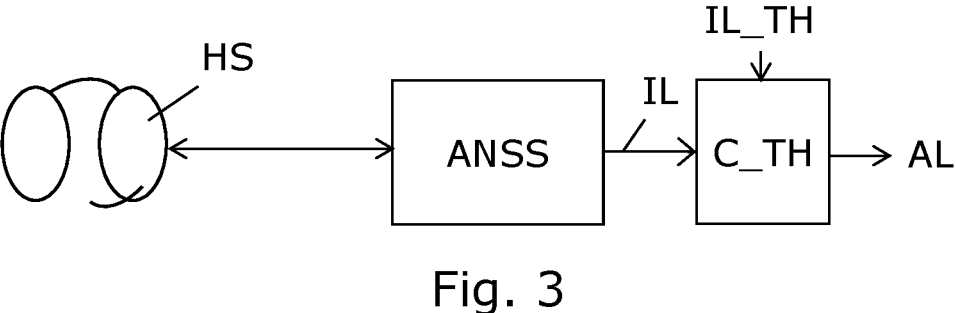
FIG. 3 illustrates an embodiment with acoustic leak detection.

FIG. 3 illustrates the above-mentioned principle of a gaming headset system embodiment with a headset HS connected to an ambient noise and speech suppression system ANSS, wherein the system ANSS continuously or at regular time intervals determines the effective acoustic insertion loss IL, e.g. by comparing features of the sound captured by the feed-forward and feed-back microphones of the headset. Preferably, the loudspeaker in the earcup is silent (switched off) when determining the effective insertion loss IL. This insertion loss value IL is applied to a decision algorithm C_TH which compares the insertion loss value IL with a predetermined insertion loss threshold IL_TH, and an alarm signal AL is then generated in response to the insertion loss value IL being below the insertion loss threshold IL_TH. The alarm signal AL may then be presented in a visual and/or audible signal to inform that an acoustic leak is present in the headset HS.

Especially, the masking signal noise level may be adjusted in response to the insertion loss value IL so as to increase the masking noinse level, if the insertion loss is low. Thereby, it can be ensured that the masking noise is sufficient to mask any possible understanding of incoming speech from the game speaker (game commentator) or audience.

Figure 4:
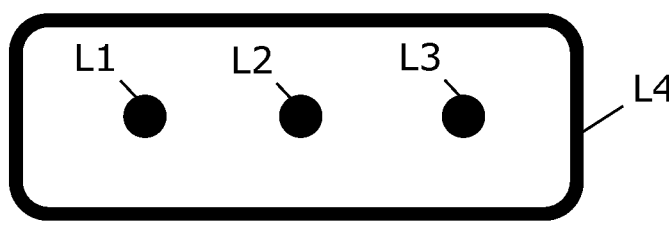
FIG. 4 illustrates a specific light indicator for signalling acoustic status of a gaming headset.

FIG. 4 illustrates a specific use of the alarm signal AL as explained above in relation to FIG. 3, namely in the form of a light indicator which can be placed e.g. on an exterior surface of the mouth microphone of the gaming headset to allow a referee or the audience to see the light indicator. As seen, the light indicator has four individual light indicators L1, L2, L3, being dot shaped and placed on a line inside a surrounding ring-shaped light indicator L4. The first light indicator L1 is used to indicate in case the effective acoustic insertion loss meets the predetermined criterion, and thus if the ANSS system functions (especially the ANC algorithm part or both the ANC algorithm part and the masking noise signal algorithm part), and there is no acoustic leak detected. The second light indicator L2 is used to indicate in case the game sound is reproduced by the loudspeaker transducers of the headset, and the third light indicator L3 is used to indicate in case the mouth microphone is functioning to allow the gamer to communicate with associated gamers. If all of the mentioned three criteria are met, and all of L1, L2, and L3 lights are on, the fourth ring-shaped light L4 is also used to indicate that all criteria are fulfilled, and that the acoustic function of the gaming headset is OK. This allows an easily visible indication e.g. to the game referee that the headset function is OK.

Figure 5:
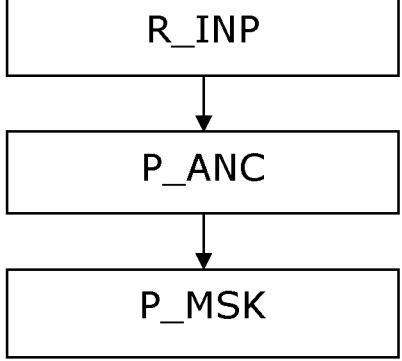
FIG. 5 illustrates steps of a method embodiment.

FIG. 5 illustrates steps of a preferred method for suppression of ambient noise and speech reaching the ears of a gamer wearing a headset for reproduction of the game sound to the gamer in a game event with audience and a game speaker (game commentator). First, receiving R_INP an input signal indicative of sound captured by one or more of: 1) a mouth microphone of the headset, 2) a feed-forward microphone of the headset, 3) a feed-back microphone of the headset, and 4) one or more sources located external to the ear-cups of the headset.

Further, processing P_ANC at least a part of said input signal according to an ANC algorithm part on a processor, such as the ANC algorithm part operating in a combined feed-back and feed-forward configuration based on signals from the feed-back and feed-forward microphones to provide output signals to the respective loudspeaker transducers in the ear-cups of the headset for suppression of ambient noise and speech reaching the gamer.

Further, processing P_MSK at least a part of said input signal, e.g. comprising a signal from at least one of the feed-forward microphone according to a masking noise signal algorithm part for generating a masking noise signal, and adding the masking noise signal to be reproduced by the loudspeaker transducers in the ear-cups of the headset for providing a psychoacoustic masking effect on the gamer of speech sound from a game speaker (game commentator) and/or speech sound from an audience.

Especially, one of or both of the ANC algorithm part and the masking signal noise algorithm part may operate on at least a signal indicative of sound from the game speaker (game commentator) and/or sound from the audience, e.g. based on output signals from microphones located near the game speaker (game commentator) or the audience, respectively.

Specifically, the masking noise may be generated by providing a scrambled version of at least a part of said input signal. E.g. the input signal for this scrambling may be based on an input from an external source, such as a microphone near the game speaker (game commentator) and/or a microphone near the audience. However, the input signal for the scrambling may alternatively or additionally be output signal from one or the feed-forward microphone of the headset. Scrambling may be provided by randomizing phase while keeping amplitude of the input signal, however there are other ways of scrambling an input signal, as known in the art.

By the combination of generating an active noise cancellation and generating a masking noise signal, an effective attenuation of noise and speech is provided in combination with an effective suppression of speech intelligibility of any residual environmental speech sound reaching the gamer's ear.

To sum up: The invention provides a gaming headset system for use in a game event. A headset (HS) has a mouth microphone (MM), and a headphone with over-the-ear ear-cups (EC) each having inside a loudspeaker transducer (LT) and a feed-back microphone (FB). A feed-forward microphone (FF) is placed on an exterior part of the ear-cups (EC). An ambient noise and speech suppression system (ANSS) serves to attenuate ambient noise and suppress intelligibility of ambient speech sound reaching the gamer (GM) in response to input signals indicative of sound captured by one or more of: 1) the mouth microphone (MM), 2) the feed-forward microphones (FF), 3) the feed-back microphones (FB), and 4) one or more sources (GSP_I, AUDM) located external to the ear-cups (EC). The ambient noise and speech suppression algorithm comprises an active noise cancellation algorithm part (ANC) and a masking noise signal algorithm part (MSK) which in combination provides an effective active attenuation of noise and speech reaching the gamer and ensuring that even weak speech sounds will not be understood by the gamer. E.g. the ANSS algorithm may use microphones near the game speaker (game commentator) and/or the audience for the ANC algorithm part and/or the masking noise signal algorithm part.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A gaming headset system for use by a gamer in a game event, the gaming headset system comprising
   a headset comprising a headphone and a mouth microphone to be worn by a gamer, wherein the headphone comprises two over-the-ear ear-cups each having inside a loudspeaker transducer and a feed-back microphone, wherein a feed-forward microphone is placed on an exterior part of each of the ear-cups, and
   an ambient noise and speech suppression system arranged to attenuate ambient noise and suppress intelligibility of ambient speech sound reaching the gamer, wherein the ambient noise and speech suppression system comprises a processor system arranged to execute an ambient noise and speech suppression algorithm comprising
   an active noise cancellation (ANC) algorithm part arranged to operate in a combined feed-back and feed-forward configuration in response to input signals indicative of sound captured by one or more of: 1) the mouth microphone, 2) the feed-forward microphones, 3) the feed-back microphones, and 4) one or more sources located external to the ear-cups, so as to provide output signals to the respective loudspeaker transducers in the ear-cups of the headphone, and
   a masking noise signal algorithm generator part arranged to add a masking noise signal to the output signals to the respective loudspeaker transducers in the ear-cups of the headphone so as to provide a psychoacoustic masking effect of speech sound from a game speaker or game commentator and/or speech sound from an audience reaching the gamer's ear drums, wherein the masking noise algorithm signal generator part generates the masking noise signal in response to at least one input signal indicative of sound captured by one or more of: 1) the mouth microphone, 2) the feed-forward microphones, 3) the feed-back microphones, and 4) one or more sources located external to the ear-cups, and
   wherein the two ear-cups (EC) are designed to provide a passive acoustic insertion loss of at least 20 dB within 300-3,400 Hz.

2. The gaming headset system according to claim 1, wherein the ambient noise and speech intelligibility suppression system is arranged to receive an input signal indicative of sound captured by the mouth microphone, and wherein the ANC algorithm part is arranged to further operate on said input signal indicative of sound captured by the mouth microphone.

3. The gaming headset system according to claim 2, wherein the headset comprises a plurality of separate mouth microphones (MM), optionally a plurality of beamforming microphones with beams in different directions, and wherein the ANC algorithm part (ANC) is arranged to receive input signals indicative of sound captured by the separate mouth microphones (MM), so as to allow the ANC algorithm part (ANC) to more effectively suppress speech sound from the game speaker or game commentator or from the audience captured from the mouth microphones (MM).

4. The gaming headset system according to claim 3, wherein the ANC algorithm part (ANC) is arranged to provide the output signals to the respective loudspeaker transducers for reproduction of game sound to the gamer with an optimized suppression of speech sound from the game speaker or game commentator and speech sound from the audience captured by the mouth microphone or mouth microphones (MM).

5. The gaming headset system according to claim 3, wherein the input signal indicative of sound captured by the mouth microphone or mouth microphones (MM) is processed by a noise suppression algorithm followed by a voice enhancement algorithm, optionally a voice or speech enhancement algorithm based on statistical signal processing, to provide an output signal where speech of the gamer (GM) is enhanced.

6. The gaming headset system according to claim 5, wherein a noise signal based on the noise suppression algorithm is provided as input to the ANC algorithm part (ANC) so as to provide an improved suppression of speech sound from the game speaker or a game commentator (GSP) and/or a game audience (AUD) noise based on sound captured from the mouth microphone (MN) or mouth microphones.

7. The gaming headset system according to claim 1, wherein the headset comprises a plurality of separate feed-forward microphones (FF) placed at different positions on an exterior part of each of the ear-cups (EC), and wherein the ANC algorithm part (ANC) is arranged to receive input signals indicative of sound captured by the separate feed-forward microphones (FF), so at to allow the ANC algorithm part (ANC) to more effectively suppress speech sound from the game speaker or game commentator or from the audience arriving to the headset from directions.

8. The gaming headset system according to claim 1, wherein the ANC algorithm part (ANC) is further arranged to receive an input indicative of information related to the game event, and wherein said information is used by the ANC algorithm part (ANC), so as to improve suppression of game related speech sound from the game speaker or game commentator and game related speech sound from the audience.

9. The gaming headset system according to claim 8, wherein said information comprises data indicative of one or more keywords related to the game, or wherein said information comprises pre-stored audio data indicative of speech sound or keywords related to the game event, or wherein said information comprises one or more pieces of information regarding an acoustic environment at a game event site.

10. The gaming headset system according to claim 1, wherein the ANC algorithm part (ANC) involves a correlation algorithm involving an adaptive filter.

11. The gaming headset system according to claim 1, comprising a cooling or temperature transport element built into the ear cups, so as to allow cooling.

12. The gaming headset system according to claim 1, comprising one or more microphones (AUDM) arranged for position near or within the audience (AUD) to provide an input signal indicative of speech sound from an audience (AUD) to the ambient noise and speech suppression system (ANSS).

13. The gaming headset system according to claim 1, wherein the ambient noise and speech intelligibility suppression system (ANSS) is arranged for connection to a Public Address system reproducing the speech from the game speaker or game commentator to provide an input signal (GSP_1) indicative of speech from the game speaker or game commentator (GSP).

14. The gaming headset system according to claim 1, wherein the ambient noise and speech suppression system (ANSS) is arranged separate from the headphone or integrated with a structure of the headphone.

15. The gaming headset system according to claim 1, wherein the ambient noise and speech suppression system (ANSS) operates on separate inputs signals indicative of speech sound from the game speaker or game commentator (GSP) and speech sound from the audience (AUD).

16. An e-sport system comprising a plurality of gaming headset systems according to claim 1, and a console for connecting the plurality of gaming headset systems, so as to allow respective gamers wearing the plurality of headsets to communicate via the mouth microphones.

17. The e-sport system according to claim 16, wherein the ambient noise and speech suppression system comprises a plurality of ambient noise and speech suppression systems (ANSS1, ANSS2, ANSSN) arranged to determine respective measures of effective acoustic insertion loss based on measurements involving sound captured by the feed-forward and the feed-back microphones, and wherein said console (CNS) comprises a processor system arranged to receive input signals indicative of said respective measure of effective acoustic insertion loss from the plurality of ambient noise and speech suppression systems (ANSS1, ANSS2, ANSSN), and wherein the console (CNS) is arranged to generate an output signal in case one or more of said effective acoustic insertion losses is below a predetermined criterion.

18. A method, comprising: participating in an e-sport or gaming event with a gaming headset system according to claim 1.

19. A gaming headset system for use by a gamer in a game event, the gaming headset system comprising a headset comprising a headphone and a mouth microphone to be worn by a gamer, wherein the headphone comprises two over-the-ear ear-cups each having inside a loudspeaker transducer and a feed-back microphone, wherein a feed-forward microphone is placed on an exterior part of each of the ear-cups, and an ambient noise and speech suppression system arranged to attenuate ambient noise and suppress intelligibility of ambient speech sound reaching the gamer, wherein the ambient noise and speech suppression system comprises a processor system arranged to execute an ambient noise and speech suppression algorithm comprising an active noise cancellation algorithm part arranged to operate in a combined feed-back and feed-forward configuration in response to input signals indicative of sound captured by one or more of: 1) the mouth microphone, 2) the feed-forward microphones, 3) the feed-back microphones, and 4) one or more sources located external to the ear-cups, so as to provide output signals to the respective loudspeaker transducers in the ear-cups of the headphone, and a masking noise signal algorithm generator part arranged to add a masking noise signal to the output signals to the respective loudspeaker transducers in the ear-cups of the headphone so as to provide a psychoacoustic masking effect of speech sound from a game speaker or game commentator and/or speech sound from an audience reaching the gamer's ear drums, wherein the masking noise algorithm signal generator part generates the masking noise signal in response to at least one input signal indicative of sound captured by one or more of: 1) the mouth microphone, 2) the feed-forward microphones, 3) the feed-back microphones, and 4) one or more sources located external to the ear-cups, wherein the ambient noise and speech suppression system (ANSS) is arranged to determine a measure of effective acoustic insertion loss based on measurements involving sound captured by one or both of the feed-forward and one or both of the feed-back microphones; and wherein the gaming headset further comprises a first light indicator placed on a visible exterior part of the headset to indicate in case said measure of effective acoustic insertion loss meets a predetermined criterion.

20. The gaming headset system according to claim 19, further comprising a light indicator placed on a visible exterior part of the headset to indicate in case game sound is reproduced by the loudspeaker transducers.

21. The gaming headset system according to claim 19, further comprising a light indicator placed on a visible exterior part of the headset to indicate in case the mouth microphone is functioning to allow the gamer to communicate with associated gamers.

22. The gaming headset system according to claim 19, further comprising a light indicator placed on a visible exterior part of the headset to indicate that all of the criteria:
  1) said measure of effective acoustic insertion loss meets the predetermined criterion, 2) game sound is reproduced by the loudspeaker transducers, and 3) the mouth microphone is functioning, are fulfilled.

23. A gaming headset system for use by a gamer in a game event, the gaming headset system comprising
  a headset comprising a headphone and a mouth microphone to be worn by a gamer, wherein the headphone comprises two over-the-ear ear-cups each having inside a loudspeaker transducer and a feed-back microphone, wherein a feed-forward microphone is placed on an exterior part of each of the ear-cups, and an ambient noise and speech suppression system arranged to attenuate ambient noise and suppress intelligibility of ambient speech sound reaching the gamer, wherein the ambient noise and speech suppression system comprises a processor system arranged to execute an ambient noise and speech suppression algorithm comprising an active noise cancellation algorithm part arranged to operate in a combined feed-back and feed-forward configuration in response to input signals indicative of sound captured by one or more of: 1) the mouth microphone, 2) the feed-forward microphones, 3) the feed-back microphones, and 4) one or more sources located external to the ear-cups, so as to provide output signals to the respective loudspeaker transducers in the ear-cups of the headphone, a masking noise signal algorithm generator part arranged to add a masking noise signal to the output signals to the respective loudspeaker transducers in the ear-cups of the headphone so as to provide a psychoacoustic masking effect of speech sound from a game speaker or game commentator and/or speech sound from an audience reaching the gamer's ear drums, wherein the masking noise algorithm signal generator part generates the masking noise signal in response to at least one input signal indicative of sound captured by one or more of: 1) the mouth microphone, 2) the feed-forward microphones, 3) the feed-back microphones, and 4) one or more sources located external to the ear-cups; and two ear plugs to be positioned in respective ears of the gamer (GM) simultaneous with wearing the headset, so as to provide a passive attenuation of sound reaching the gamer's ear drums.

* * * * *